United States Patent [19]
Kroll

[11] Patent Number: 5,570,416
[45] Date of Patent: Oct. 29, 1996

[54] CALL CENTER MANAGEMENT SYSTEM

[75] Inventor: Jeffrey R. Kroll, Fair Lawn, N.J.

[73] Assignee: ComTel Debit Card Limited, L.L.C., Lyndhurst, N.J.

[21] Appl. No.: 298,377

[22] Filed: Aug. 30, 1994

[51] Int. Cl.⁶ .................. H04M 15/00; H04M 17/00; H04M 1/00
[52] U.S. Cl. .................. 379/114; 379/127; 379/130; 379/144; 379/156; 379/157
[58] Field of Search ............... 379/149, 112, 379/127, 114, 156, 157, 167, 130

[56] References Cited

U.S. PATENT DOCUMENTS 4,776,000 10/1988 Parienti .................. 385/144 X
4,777,646 10/1988 Harris .................. 379/144 X
4,951,308 8/1990 Bishop .................. 375/144 X Primary Examiner—Stephen Chin
Assistant Examiner—Paul Loomis
Attorney, Agent, or Firm—Davis, Graham & Stubbs LLP

[57] ABSTRACT

A Call Center Management System for the operation of a public calling center includes a plurality of telephones, a junction box, a central operating unit, a print and a display device. The Call Center Management System provides: a prepayment before telephone usage, continuous recalculation of a caller's deposit during to telephone usage, notification to the caller of the amount of deposit consumed, automatic call termination when the deposit has been consumed, and refund to caller for amount of unused deposit.

10 Claims, 7 Drawing Sheets

CALL CENTER MANAGEMENT SYSTEM

FIELD OF THE INVENTION

This invention relates to public access telephones, and has special application to so called "calling centers", by providing an automated prepayment system for continuous modular telephone usage.

BACKGROUND OF THE INVENTION

A "calling center" is a facility having between 1 and 24 telephones, and constructed for the purpose of providing an area for the general public to make domestic and international telephone calls. The calls are typically paid for in cash or credit card, and in some cases, a calling or debit card may be used. Additional services may include copying, faxing, mail services, money transfer and more. The environment is manned, secured, and provides privacy for the telephone calls. Calling centers often appeal the to lower-income, immigrant or transient person who has not yet, or is unable to establish his or her own credit or his or her own home phone.

A typical method for the operation of calling centers is as follows: A person enters an arcade and tells a cashier he or she would like to make a call. The cashier assigns the caller to one of several booths containing a telephone by writing a booth number on paper. The caller then goes to the booth and makes one or more calls through a normal touch tone telephone set. At the end of each call, a record is printed at the cashier's desk which indicates the phone/booth making the call, the number called, and the length of the call. When the caller has finished, he or she returns to the cashier's desk to pay for the calls made from his or her assigned booth. The cashier then totals the records of calls made from that booth by manually pricing the calls based on destination and time. The cashier requests payment and the transaction is complete.

There are many problems inherent in operating a public calling center in this fashion. For instance, all the touch tone telephones are live and there are limited mechanisms to ensure that a caller uses the booth to which he or she was assigned. The pricing process of calls made for calculation of amount due is manual and subject to error. Additionally, calls are not billed to the caller until the end of the transaction, sometimes resulting in calls being made which are never paid for. Due to the manual process of recording transactions, bookkeeping and accounting for the operation of the calling center is tedious and inaccurate.

Another problem often encountered in operating a calling center occurs when a call is made but not completed, yet the phone rings beyond a designated grace period time. The typical calling center incorporates a PBX/Channel Bank solution for connecting the calls dialed to T-1 lines. A PBX, however, can not tell whether or not a call which it has connected to the telephone network has been answered. Thus, if a call record is produced by a PBX, the PBX assumes that a call was made for the duration of the call record. In a typical calling center, "grace periods" are used to calculate billing. A grace period is set in the PBX which is normally one minute long. Records produced that are less than one minute are thrown away while those longer than one minute are billed, regardless of completion. The result is inaccurate billing where completed calls may escape being charged, while incomplete calls might be billed merely because the caller allowed the phone to ring beyond the grace period.

The cost of operating a calling center with a current system is very high. Equipment required for a conventional system includes a small PBX or key system, a Channel Bank to connect the signals to an outgoing T-1 line, a call accounting or SMDR system to record the calls, a printer for the display of call records to the cashier, and the actual touch tone phones.

Although there are in existance systems which manage the operation of public modular telephones and systems which centralize or enhance the means of making payment for the service, none of these solve the unique problems presented by the operation of a public calling center.

For example, U.S. Pat. No. 5,138,648 of Palomeque et al. discloses a system for the management of public modular telephones with means for making payment by using one of several types of cards such as credit, prepayment, and telephone subscriber or multiservice cards. The system disclosed contains a center for validation and billing of credit cards and telephone subscriber cards which validates, on a national scale, credit cards, telephone subscriber cards, customer black and grey lists, and receives system information and generates billing reports.

U.S. Pat. No. 5,233,647 of Palomeque et al. discloses a system for the operation of public modular telephones. This system provides a means to centralize alarm reports, supervises and controls validation units, adapting units and modular phones, and generates failure and service reports. The operating and management software include a number of maintenance functions including situation reports, traffic statistics, failure and repair control.

U.S. Pat. No. 4,595,983 of Gehalo et al. discloses a central office powered credit only telephone paystation. The paystation includes a reader to read the user's credit information which may be encoded on the magnetic strip of a conventional credit card. The paystation uses a microcomputer to process the credit and dialing information entered by the user. The paystation also allows the user to dial a plurality of nonrestricted numbers without having to use a credit card. The paystation is powered solely from the central office to which it is connected and keeps the transmitter turned off until it is needed.

U.S. Pat. No. 4,935,956 of Hellwarth et al. teaches a system of automated public phone control for charge and collect billing. In the system disclosed, the charge and collect-call functions of a public telephone are arranged automatically by a microcomputer system preferably connected on a customer premises between the phone terminal instrument and the local loop, wherein control of said instrument, network signaling and call placement voice prompting of the call parties, recognition of responses from the parties and the network, call detail records of numbers and timings and data communications with other computers are accomplished by the microcomputer system without requiring human operator assistance or the transmission of calls over excessive distances to reach such an operator.

U.S. Pat. No. 4,517,412 of Newkirk et al. describes a card-actuated telecommunication network. The network is constituted by a master control central linked to a group of satellites installed at different locations such as airport terminals. At every installation, the satellite acts as the hub for many local telephone stations equipped with a telephone and card reader adapted to scan the callers credit card. The signal from the originating local station is transmitted through the satellite to a verification processor at the central which determines the acceptability of the card. If the card passes this test, the originating station is advised and the telephone set is activated to permit the caller to call.

U.S. Pat. No. 5,065,393 of Sibbitt et al. discloses a system and method for controlling the cross connect field of a multi-locational switched network from a single location under the control of instructions from the end users. The system is designed to provide cost accounting and auditing information pertaining to the reserved time for each end user on a link by link basis as well as for the time during which the links were actually used for communication.

U.S. Pat. No. 4,897,870 of Golden et al. discloses a network implemented pay telephone set. For only selected user telephones numbers, the telephone system places a set-up call to a call processor to request billing and other information needed to process the call at the local processor. The set-up call is then terminated and the user's call is automatically re-dialed into the switched telephone network from the telephone central office which serves the telephone presently being used.

U.S. Pat. No. 4,387,278 of Hayes et al. teaches a maintenance facility for a telephony system with remote port groups. The telephony network is comprised of a digital central office and one or more remotely located digital satellite units. Each satellite unit connects to a number of remote subscriber lines and monitors these lines to establish communications through interconnecting spans and a digital satellite interface at the digital central office.

SUMMARY OF THE INVENTION

The system of this invention for managing the operation of public calling centers is referred to as a Call Center Management System, (CCMS). The CCMS of this invention presents a solution to the problems posed by calling centers having unsecured modular telephones, post-call payment procedures, and significant manual intervention.

More specifically, the Call Center Management System, CCMS, is a system allowing the controlled and supervised use of telephones within a public calling center.

The Call Center Management System is comprised of a plurality of telephones, a junction box, a central operating unit, a display unit and a print unit. Through a process that will be detailed in subsequent sections, the CCMS hardware and software components of the central operating unit have eliminated the need for costly equipment such as PBX and Channel Banks used at a conventional calling center.

The Call Center Management System provides:

(a) a prepayment in the form of cash or credit before a telephone is activated and usage begins, (b) a continuous calculation of the consumption of a caller's deposit (c) a notification to the caller informing the caller of the amount of their deposit they have consumed (d) a real-time pricing of the calls made from a telephone/booth (e) the ability to detect a call that has not been completed even though the call was permitted to ring for a significant period of time (f) the ability to activate a phone only for a specified period of time and/or only so long as the caller's deposit allows (g) the ability to deactivate a phone when a caller's deposit has been exhausted (h) the ability to allow for continuous telephone usage by the caller for the duration of their deposit.

Through the CCMS switching hardware and software interface, the CCMS of this invention has eliminated the need for PBX or Key system and D4 Channel Bank equipment typically used in a conventional calling center, and directly connects telephones to the T-1 telephone lines.

By PBX we mean a piece of equipment that connects a device, such as a telephone, to the switched telephone network. By Channel Bank we mean a device that can convert an analog signal to a digital signal. By T-1 lines we mean high capacity digital telephone lines.

The typical use of the PBX and Channel Bank in a calling center is as follows: Calling centers often buy T-1 service from the long distance telephone service providers because the long distance providers charge much less for T-1 service than for regular service, also called switched service. The T-1 service is less expensive than regular service due to the high carrying capacity of a T-1 across much fewer digital circuits. Calling centers use T-1 service so that they may offer discounted rates to their clientele. A PBX is a piece of equipment that connects telephones to the regular, switched telephone network. A PBX allows an analog or digital device which is attached to it, such as a telephone, to enter digits to specify a calling location. The PBX then interprets those digits and sends the call over the appropriate lines from the local telephone company and the long distance provider. However, most PBX's, and certainly the smaller versions which are often used in calling centers, can not interface directly with digital lines such as T-1 lines. Therefore, the analog lines must go into a Channel Bank which converts the analog signal to a digital. The Channel Bank then sends the information over the digital line, the T-1, to the telephone company.

The CCMS of this invention eliminates the need for a PBX and Channel Bank in a calling center by directly connecting the telephones to the telephone network. The telephones in a calling center are connected directly into CCMS through analog input boards. These boards are programmed to interpret the digits entered by the caller in the same way that a PBX would interpret the digits. The CCMS then switches the telephone call to the output telephone lines by using a digital output board. The digital output board is programmed to send the signal directly to the telephone network by simulating all the appropriate interfacing normally accomplished by the Channel Bank.

The Call Center Management System provides a mechanism for prepayment before telephone usage. Prepayment may be in any form, such as cash, credit card, telephone calling or debit card. A caller entering the calling center leaves a deposit with a cashier. The cashier then assigns a phone/booth to the caller and enters the information in the CCMS database. An alternative approach is to assign the caller a PIN number and allow the caller to use any telephone in the center up to the amount of their deposit.

Access to the telephones in the center is secured. The telephones controlled by the CCMS are activated only for the time allowed by a caller's prepayment. When a caller enters a booth in the calling center to place a call, he or she picks up the telephone handset and receive a dial tone. A caller enters the number he or she wishes to call by pressing the digits on the telephone. The CCMS of this invention interprets the digits entered by the caller and searches the database and billing tables to authorize the call. The CCMS calculates the maximum number of calling minutes that the caller in the phone/booth may place to the number entered, then switches the call to the output telephone lines. If the caller's time has expired, the CCMS sends out a signal to the analog input board and the digital output board to terminate the call.

The caller may continuously make calls in the privacy of his or her assigned booth until his or her deposit has been exhausted. Once a caller places a call, the CCMS searches the database and billing tables to authorize the call and calculate the maximum number of calling minutes to that number. If the length of the phone call has not reached the maximum number of calling minutes when the call is terminated, the CCMS searches the database and billing tables and calculates the charge for the call made. It then subtracts the charge for the call from the caller's deposit. The CCMS database is updated with the amount of unused deposit so the caller may place another call. As long as a deposit balance greater than zero remains, the caller may repeatedly place calls.

The system provides for automatic calculation of a caller's consumption of their fund. This calculation includes appropriate taxes and applicable rates. When a caller enters a calling center, he or she leaves a deposit with a cashier. The cashier assigns the caller to a phone/booth, and also enters the amount of the deposit and the booth number into the CCMS. For each call placed from a booth, the CCMS uses that dialed number and knowledge of the location where the call originates to enter the billing tables and determine the amount of minutes the caller may connect to the dialed number for the money deposited. The billing tables used to determine the length of the call allowed, and subsequently used to set the timer have a wide range of options. For example, the billing tables may be based on distance called, day of the week, and time of day. Alternatively, the tables may use a flat minute charge based upon country and city called.

The system provides an automatic notification process to alert the caller of the amount of his or her fund which remains before and after each call is made, and when the caller's time is about to expire. The CCMS starts a clock upon call answer by the called party. When the caller's time is about to expire or if the caller is between telephone calls, the CCMS of this invention sends a message to the analog input board, signalling the input board to play a recording to the caller that his or her time is about to expire or to play a message to the user which indicates his or her unused deposit.

If a fund is not entirely consumed by telephone usage, then through a cashier's request the Call Center Management System will automatically deactivate the phone assigned for that deposit and calculate the refund due to the caller.

The CCMS of this invention is able to detect when a call has not been answered, thus eliminating inaccurate billing for calls not completed. The CCMS solution to this problem utilizes "answer supervision" technology provided by T-1 service. Answer supervision technology provided by T-1 service means that once a call is answered at the called end, the T-1 sets a bit, known as the answer supervision data bit, which will be transmitted back to the output digital boards. Since there is no intervening PBX or Channel Bank in the CCMS solution, the CCMS is programmed to intercept the answer supervision data bit from the T-1 and know exactly if and when the call has been answered. The CCMS clock set for the caller can start at the exact second of the answer.

Billing tables used by the CCMS to calculate call charges exist in a central location. Any pricing changes are made to the central location, and downloaded automatically without operator intervention. A system administrator at a centralized location can dial into the calling center and download one or more billing table. The update or updates made will be effective immediately. The foregoing describes a remote, teleprogrammable method of maintaining billing information. Such method utilizes high speed data transmission across existing telephone lines. Said method incorporates the use of conventional devices and circuitry such as serial I/O and Modulator-Demodulators (MODEMs). Alternatively, the update may be triggered upon request by the owner/operator of the calling center, or upon direct operator input at the calling center.

Additionally, the system for controlling public calling centers allows for obtaining statistical information of the data contained in its database in order to know number of calls made, money collected, refunds given, areas called, minutes used by long distance carriers, federal taxes collected, state taxes collected, phone usage.

DESCRIPTION OF THE INVENTION

Figure 1:
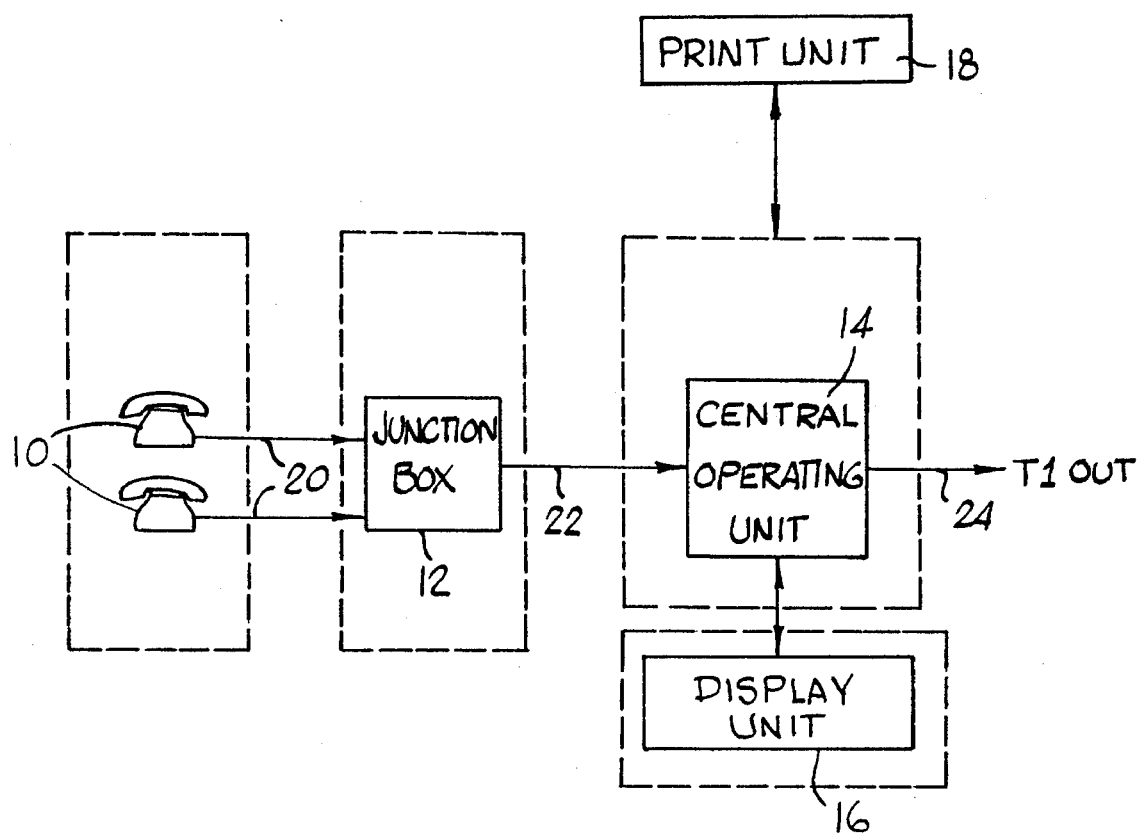
FIG. 1 is a schematic block diagram of the call center management system components.

The Call Center Management System is comprised of the following components seen with reference to FIG. 1:

(a) public modular phones 10 individually placed in private booths (b) a junction box 12

(c) a central operating unit 14

(d) a display unit 16

(e) a print unit 18

Public modular phones 10 are telephones of an intelligent or non-intelligent nature located in booths within the calling center arcade. The telephones are numbered and assigned to a caller by a cashier. They remain inactive, having no dial tone, until activated by the system for a time determined by a caller's prepayment.

The junction box 12 functions as the connection device between the telephones 10 and the central operating unit 14.

The junction box 12 is connected by connector 20 to a plurality of telephones 10 located in booths throughout the arcade. The connector 20 establishes a connection between these two elements using traditional telephone junction box wiring.

The junction box 12 is connected by connector 22 to the central operating unit 14. In a preferred embodiment, this connection is established using a Dialogic or similar analog input board 30 included in the CCMS switching hardware and software interface which is detailed in FIG. 2 and will be discussed later.

The central operating unit 14 functions as the main driver of the Call Center Management System. It controls the activation and deactivation of the telephones and the connection of the phones to the switched telephone network. It provides the interface to the cashier for transactions and the means for report generation.

In its preferred embodiment, the central operating unit 14 is a Intel 486 based machine which is fitted with hard disk storage devices for quick data access and also with tape type storage devices for mass storage long term.

The central operating unit 14 has a print device 18 attached which allow for the printing of booth assignments, receipts, and reports.

A display unit 16 is connected to the central operating unit 14 and provide the operator an interface by which to enter and display system data.

The central operating unit 14 is connected by connector 24 to T-1 service lines of the telephone network. In a preferred embodiment, this connection is established using a Dialogic or similar digital output board.

Figure 2:
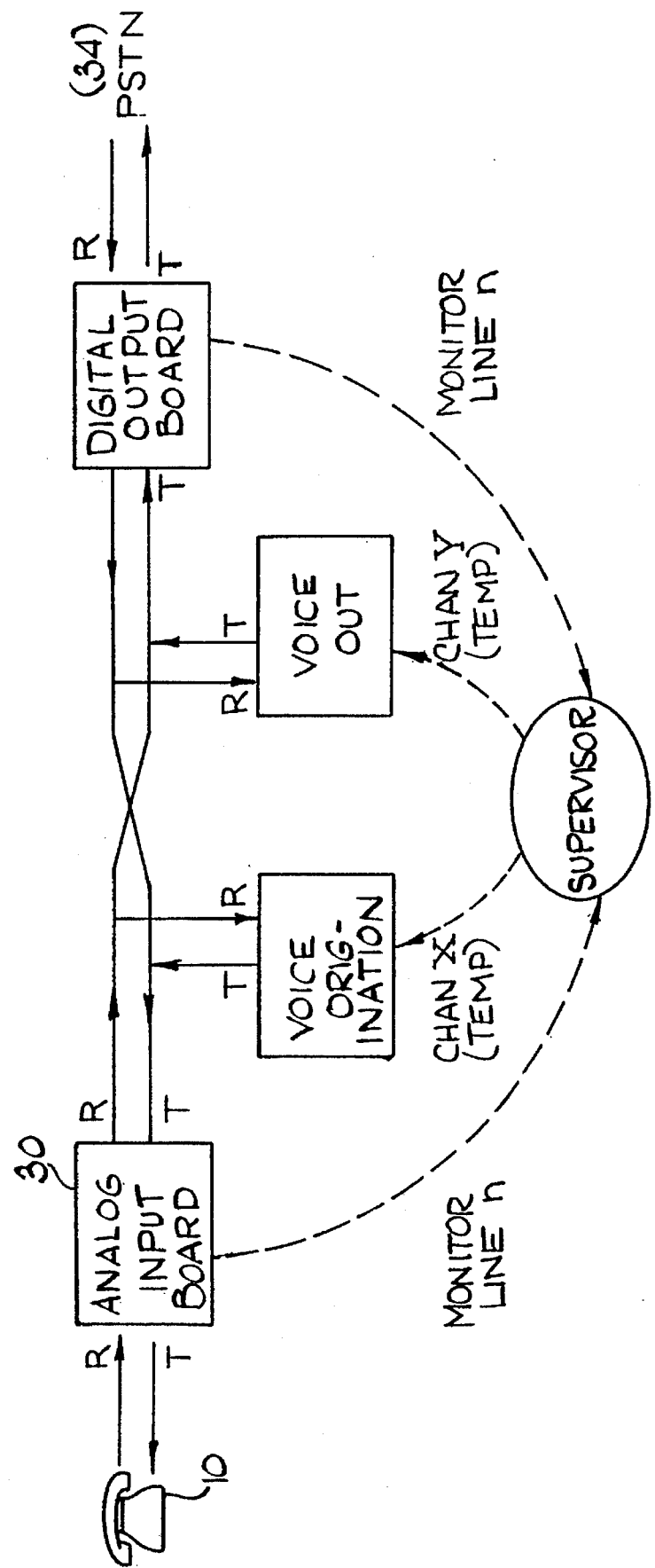
FIG. 2 is a schematic block diagram of the call center management system, showing additional details of the switching hardware and its software interface.

With reference to FIG. 2, the CCMS switching hardware with its software interface which controls the connection of the modular phones 10 to the telephone network 34 can be better understood. The telephones 10 in a calling center are connected by connector 22 into CCMS 14 by analog input boards 30. These boards are programmed to interpret the digits entered by the caller in the same way that a PBX would interpret the digits. The CCMS 14 then switches the telephone call to the output telephone lines 24 by using a digital output board 32. The digital output board is programmed to send the signal directly to the telephone network by simulating all the appropriate interfacing normally accomplished by the Channel Bank.

Figure 3:
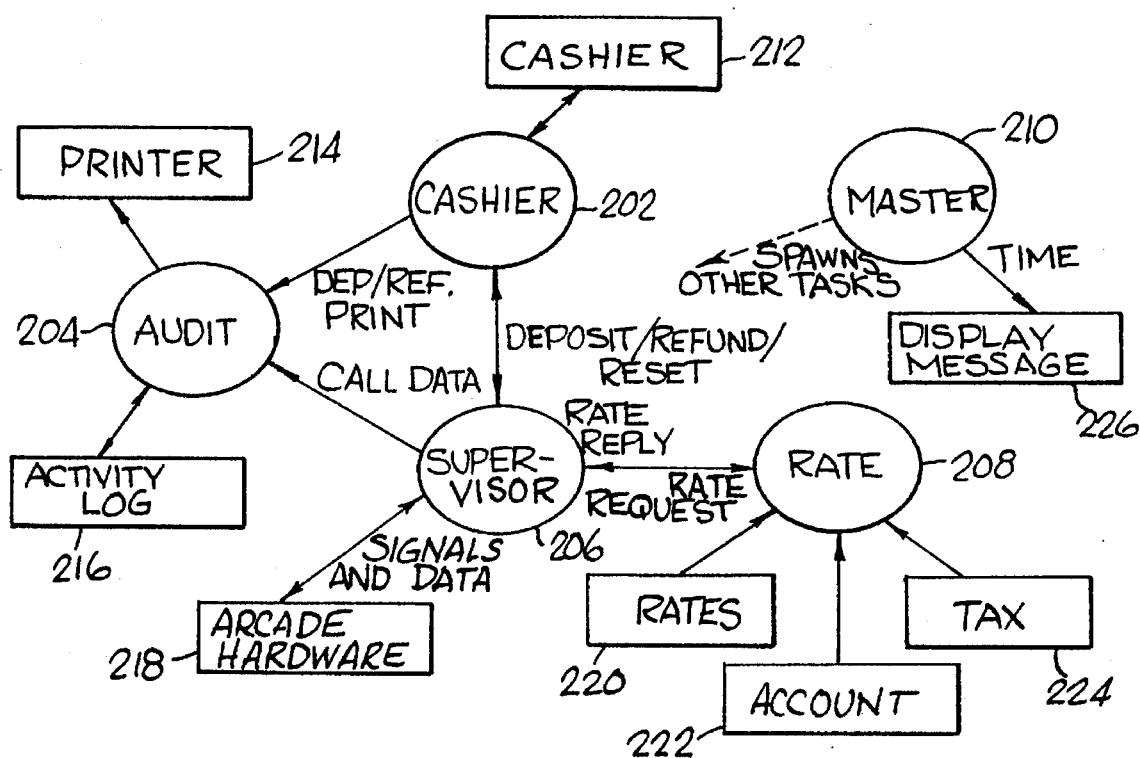
FIG. 3 is a flow chart showing the flow of data between the functions in the call center.

The central operating unit 14 hosts the execution of the systems software element which is depicted in FIG. 3.

As detailed by FIG. 3, the software component of the Call Center Management System is comprised of five subcomponents. These subcomponents are the cashier function 202, the audit function 204, the supervisor function 206, the rate function 208 and the master function 210. FIG. 3 illustrates the exchange of data among these subcomponents.

The cashier subcomponent 202 presents the cashier interface 212 to the display unit. It can accept input which includes deposit information for a new transaction. It can generate output which includes deposit information, booth assignment and refund amount by either display 212 or print 214.

The system audit function 204 controls the logging of data in the systems activity log 216 and drives the print device 214 for output which includes statistical reports, refunds and receipts.

The system rate function 208 controls the access to the rate 220, account 222 and tax tables 224. The rate function will receive a request from the supervisor and calculate the applicable charge for a call made.

The supervisor 206 controls the signalling to the systems hardware devices 218 such as the activation of a phone, the connection of a phone to the switched telephone network, and the deactivation of a phone.

The master function 210 controls the message 226 to the caller of time remaining for phone usage out of their deposit.

Figures 1, 4A:
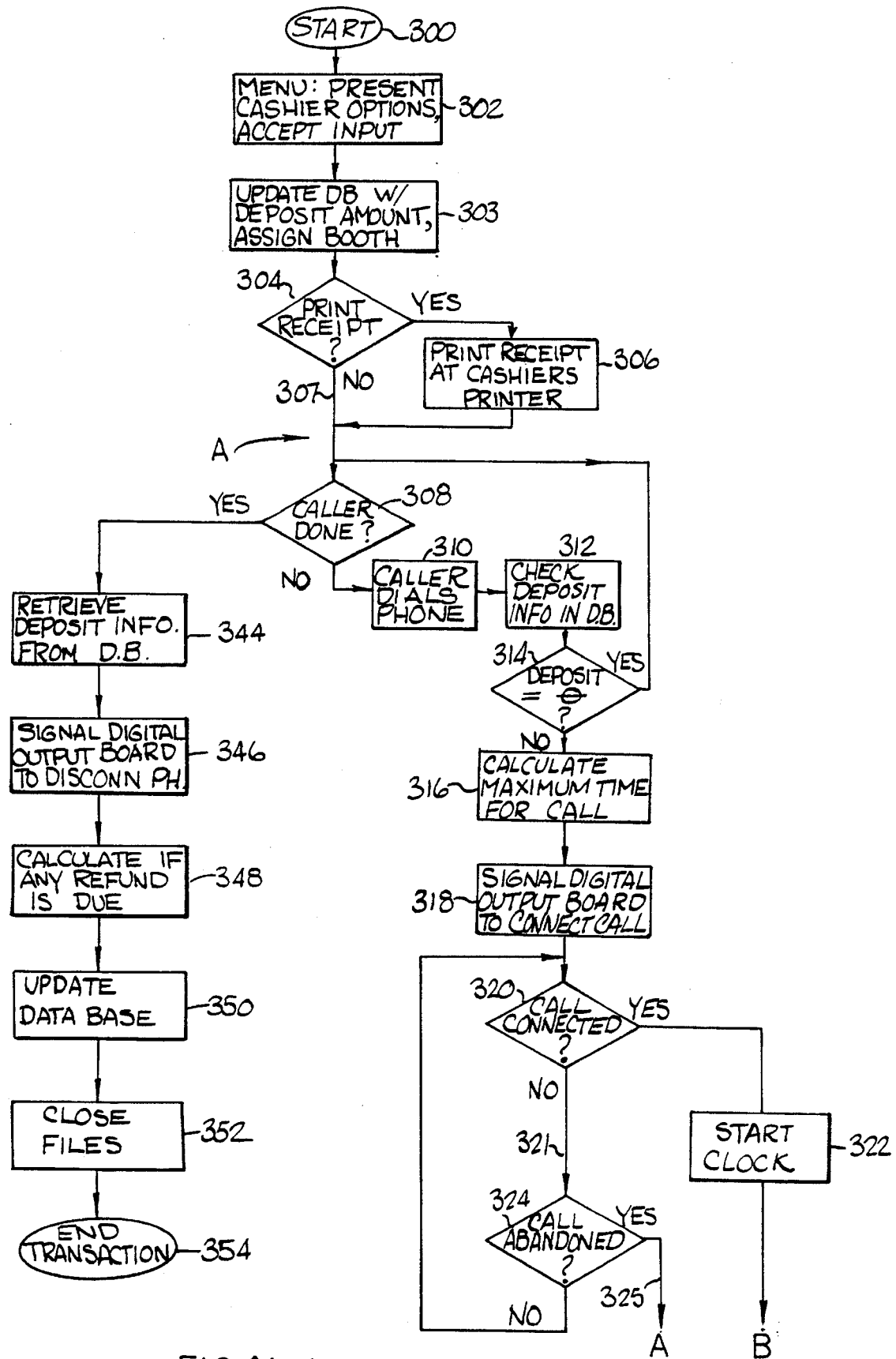
FIGS. 4A–C are flow charts showing the operation of the system of this invention.
Figures 2, 4A:
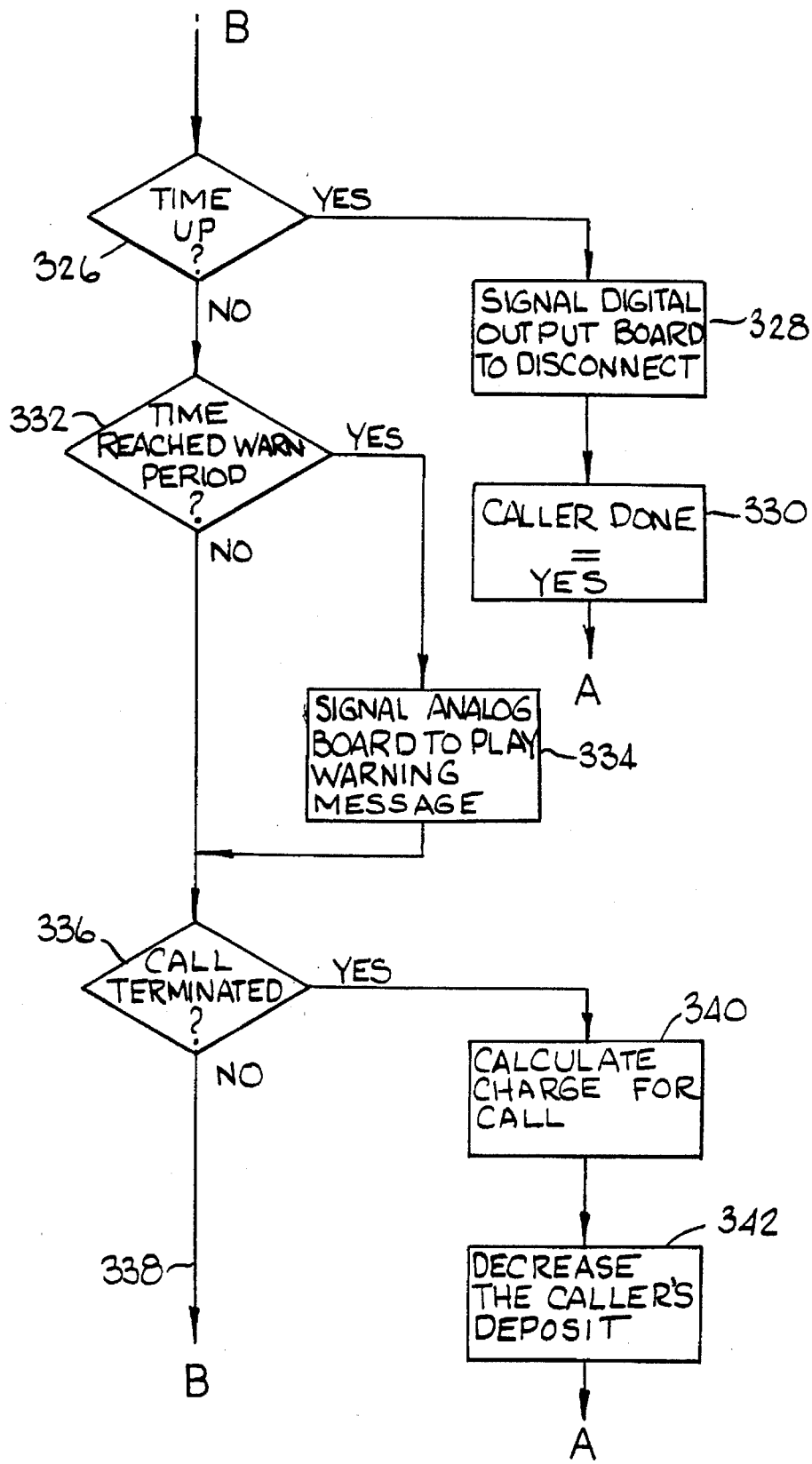

FIG. 4A maps the process flow within the system. A new transaction is initiated at step 300 when the cashier enters a caller's deposit information through the cashier interface 302. The CCMS updates the database with the caller's deposit information at step 303. The CCMS gives the cashier the option at step 304 of printing a receipt, which includes the booth assignment, for the caller. The cashier either informs the caller 307 of their phone assignment or optionally prints 306 the assignment to an attached printer.

At step 308, the caller can terminate the process. So long as the caller is not finished at step 308 at the calling center, he or she may go to their assigned booth and dial the phone 310. The system compares the booth/deposit information 312 for the phone/booth placing the call with the CCMS database. If the deposit balance is not greater than zero at step 314, then the system loops back to step 308, indicating that the caller is done. If, at step 314, the deposit is not equal to zero, the system advances to step 316 and calculates the maximum time allowed for the call based on information in the systems billing tables and the caller's deposit information. The system then proceeds to step 318 where the digital output board is signalled to connect the call to the switched network. Next, the system waits for the call to be connected at step 320 by constantly checking the answer supervision bit of the T-1 service. If the call is connected at step 320, a clock is started at step 322 for the user's call. If the call is not connected at step 320 then the system proceeds to step 324 and checks to see if the call was abandoned. If the call was abandoned then the system proceeds to step 325, and then loops back to step 308 to determine if the caller is finished at the center. If the call has not been abandoned, the system loops back to step 320 and waits for the answer supervision bit to be set.

Resuming the discussion at step 322 where the clock was started, the system proceeds to step 326 where it checks to see if time is up. If time is up, the system will signal the digital output board to disconnect the call at step 328, it will set the caller to done, and loop back to step 308 to terminate the transaction. If, at step 326, the time (which was set in step 316) has not expired, the system checks to see if the warning time has been reached (step 332). If the pre-set warning time has been reached, the system proceeds to step 334 and signals the analog input board to play the warning message to the caller. If, at step 322, the warning time has not been reached, the system will proceed to step 336 and determine if the call has been terminated. If the call has not been terminated (step 338) the system loops back to step 326 and tests the caller's clock to see if time is expired. If, at step 336, the call has been terminated, the system checks the database and calculates the charge for the call 340. The system then decreases the users deposit by the charge for the call 342, and loops back to step 308 to see if the caller is finished at the calling center.

At step 308, if the caller has finished his or her business at the calling center, the system will check the caller's deposit information in the database 344. The system signals the digital output board to disconnect the caller's assigned phone, 346, and proceed to step 348 where it will determine if any refund is due.

The database is updated with a record of the transaction 350, the files are closed, 352, and at step 354, the transaction is terminated.

Figure 4B:
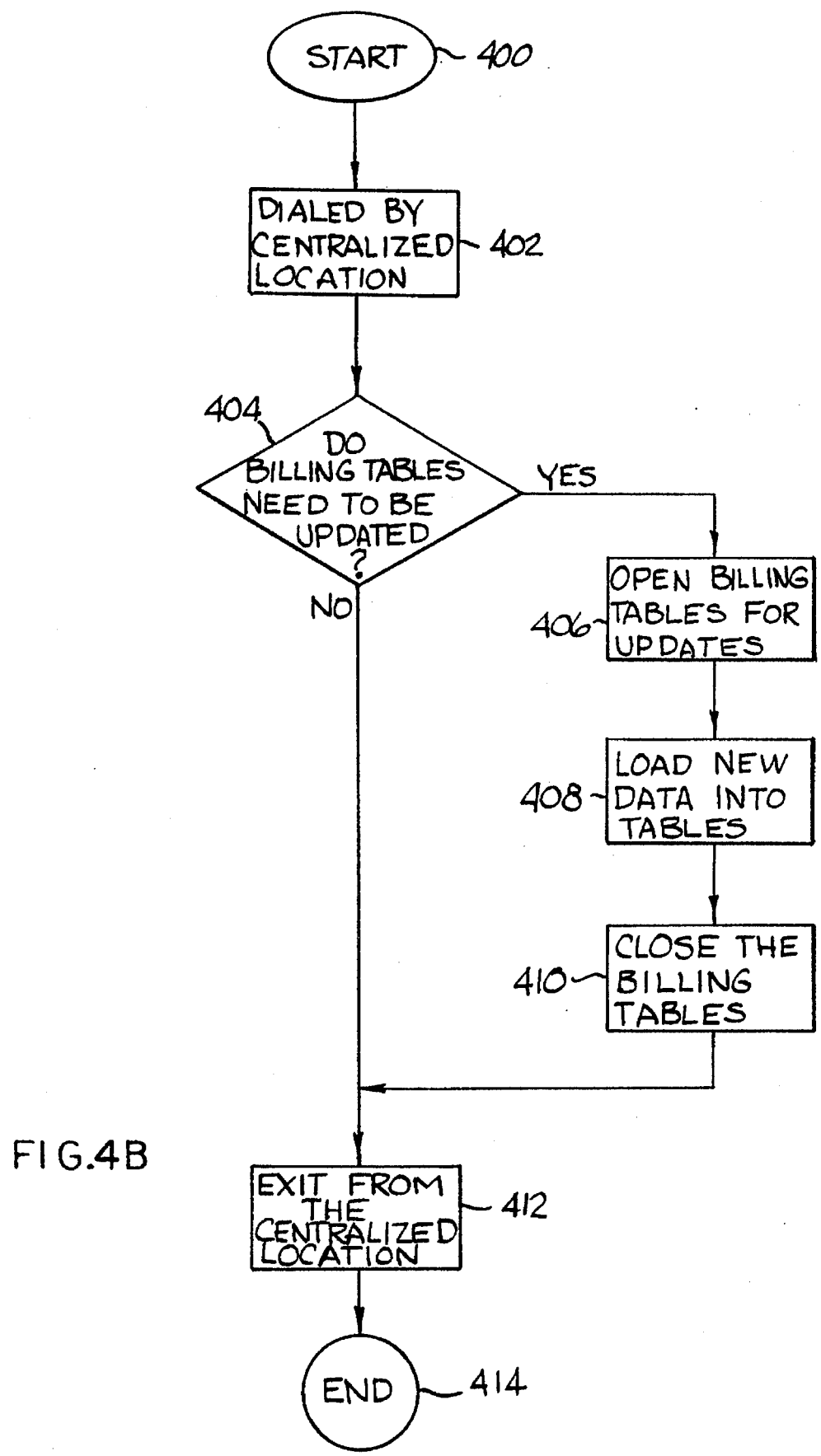

The system software provides the means for controlling price changes in a centralized location which is depicted in FIG. 4B. This process is started when the CCMS is dialed by the central location 402. The CCMS system administrator then checks if the pricing information has changed or the tables need to be updated 404. If the tables do need to be updated, the system administrator opens the billing tables in step 406,loads them with the new billing information at step 408, then closes the tables at step 410. The system then proceeds to step 412 where the system administrator at the centralized location exits the CCMS and the process is ended.

If, at step 404, the tables do not need to be updated, the system proceeds directly to step 412 where the system administrator at the centralized location exits the CCMS and the process is ended 414.

Additionally, the system includes the ability to obtain statistical information such as accounting and usage data about the call center in report format. Data stored by the system through the audit function 204 can be retrieved and printed as detailed in the flow chart in FIG. 4C. Such statistical information includes numbers of calls made, money collected, refunds given, minutes used by long distance carriers, federal taxes collected, state taxes collected, and booth usage.

Figure 4C:
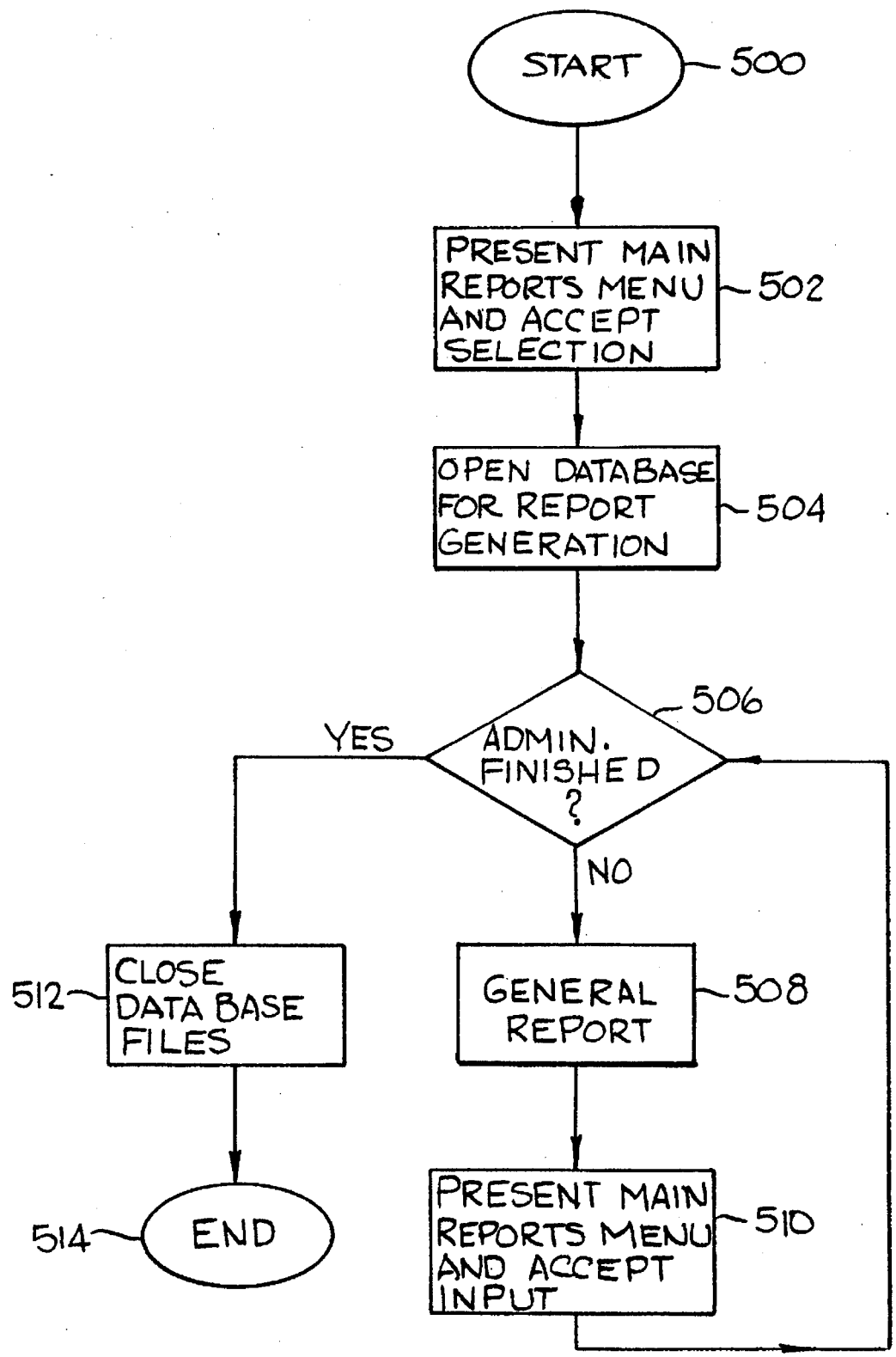

Resuming the discussion with reference to FIG. 4C, the process to generate statistical reports is as follows: The program prompts an administrator with a main menu at step 502 and opens the database for report generation at step 504. The system then checks to see if the administrator is finished, step 506. If, at step 506, the administrator is not finished, the system generates the requested report at step 508, and re-displays the main menu to the administrator and accepts their input 510. The system loops back to step 506 to check if the administrator is done.

If, at step 506, the administrator is done, the system proceeds to step 512 and closes the files. The process is then complete 514.

Enhancements and Improvements

There are alternative approaches to operating the "calling center" than the ones previously described. For example, rather than assigning a dedicated booth to a caller for use in the amount of his or her deposit, the CCMS may have the ability to allow the caller to use any booth in the calling center. When this method is employed, the CCMS may print a receipt at the cashier when the money is deposited to make a call. That receipt will contain the specific dollar amount of the deposit and a security number which is generated by CCMS. The caller may then enter any booth in the center, and dial his or her security number before placing calls. This security number is associated with the specific dollar amount of the caller's deposit and will be reduced just as previously described. Optionally, the receipt may be taken from the calling center and used at another time at the same calling center. This eliminates the need for the caller to stop at the cashier's desk upon call completion to get a refund of unexpended dollars.

Another possible enhancement to the CCMS is to provide the ability to generate a "debit calling card" for use inside or outside the calling center. This card, generated by the CCMS, would use the funds deposited or the amount of funds left after calling to determine a balance. This card could be used outside the calling center from any telephone for the amount of the balance remaining on the card. The security of the card is maintained by the CCMS card generation. This "debit calling card" approach eliminates the caller having to wait for refunds, while providing the caller with universal access.

Optionally, the call center management system can be established such that it could receive calls from the outside on local or long distance lines so that people with CCMS issued cards, or cards issued by the calling center owner can access a line through CCMS. This extends the capabilities of CCMS into the community so callers may obtain the benefits of CCMS without having to actually be in a calling center. When this approach is employed, a caller may call a local, long distance, or 800 number to access the CCMS. The caller will then enter his or her security number and place calls for the amount of their unexpended deposit.

It can be seen, therefore, that the CCMS system of this invention provides a solution to the typical problems of a calling center. The CCMS provides a means for prepayment in the form of cash or credit before telephone usage and the means for activation of a telephone in a calling center only for the duration of a caller's deposit. CCMS provides an attractive alternative to pay telephone usage for those people who do not have dedicated telephone service, or do not have established credit. Lastly, the need for costly networking hardware in a calling center is eliminated by the CCMS of this invention.

What is claimed is:

1. A call center comprising:

(a) a plurality of telephones, (b) a central operating unit operatively connected to said plurality of telephones by a junction box and a switched area network, for selectively activating each of the plurality of telephones and for selectively sending and receiving usage messages to and from each of the plurality of telephones for obtaining usage information, the central operating unit selectively activating and deactivating each of the plurality of telephones, wherein an operator operates the center and a caller makes use of the center by making the deposit of the telephone usage credit for usage of the phone from among the plurality of telephones, (c) a display unit and a printer operatively connected to the central operating unit for displaying and printing an output from the central operating unit, said output including usage information, (d) an information storage device operatively connected to the central operating unit for storing information, and for providing information to, and receiving information from, the central operating unit, said information including usage information, (e) credit receiving means within the central operating unit for receiving a credit amount for a particular phone, (f) continuous recalculating means within the central operating unit including a timer, in operative communication with said credit receiving means and with said information storage device, for continuously recalculating the credit amount remaining on the particular phone, wherein the central operating unit selectively activates that particular phone when the credit amount is a positive number and deactivates the particular phone when the credit amount is a zero or a negative number, (g) selective user-controlled termination means in operative communication with the central operating unit for terminating the usage of the particular phone at the user's request, wherein the central operating unit deactivates the particular phone at the user's request, and the continuous recalculating means recalculates the credit remaining on the particular phone upon deactivation, and (h) a modifiable operator-controlled information base in operative communication with the information storage device, said information base containing phone rate time and charge information for use by the continuous recalculating means, wherein said information storage device stores information about the state of the call center and the usage of each of the plurality of telephones including the particular phone, and each of said display and printer selectively displays and prints the information about the state of the call center and the usage of each of the plurality of telephones including the particular phone.

2. The call center of claim 1, further comprising automated updating means in communication with said information base for updating said phone rate time and charge information.

3. The call center of claim 2, wherein said automated updating means includes remote teleprogrammable means for updating said phone rate time and charge information remotely.

4. A method of operating a call center, comprising the steps of:

(a) linking a plurality of telephones to a central operating unit by a junction box and a switched area network, for selectively activating each of the plurality of telephones, the central operating unit being operatively connected to a display and a printer for displaying and printing an output from the central operating unit being operatively connected to an information storage device for storing information, and for providing information to, and receiving information from, the central operating unit, wherein an operator operates the center and a caller makes use of the center by making a deposit of a telephone usage credit amount with the operator for usage of a particular phone from among the plurality of telephones, (b) selectively activating and deactivating each of the plurality of telephones, (c) selectively sending and receiving usage messages to and from each of the plurality of telephones for obtaining usage information, (d) storing said usage information, (e) selectively displaying and printing said usage information to an operator, (f) crediting the credit amount for the particular phone, (g) continuously recalculating the credit amount remaining on the particular phone based upon phone rate time and charge information, activating that particular phone when the credit amount is a positive number, and deactivating the particular phone when the credit amount is zero or a negative number, (h) selectively terminating the usage of the particular phone at the user's request, deactivating the particular phone in response to the user's request, and recalculating the credit remaining on the particular phone upon deactivation, and (i) maintaining a log of information about the state of the call center and the usage of each of the plurality of telephones including the particular phone, and selectively displaying and printing the information contained in the log.

5. The method of claim 4, wherein said step of continuously recalculating the credit amount remaining includes the step of updating said phone rate time and charge information prior to recalculating.

6. The method of claim 5, wherein said step of updating said phone rate time and charge information prior to recalculating is done remotely.

7. A call center management system comprising:

a plurality of telephones operatively connected to a central operating unit which includes an information storage device, credit receiving means within said central operating unit for receiving a deposit of a telephone usage credit for usage of a particular telephone from among the plurality of telephones, and calculating means for continuously recalculating the particular telephone's usage and continuously subtracting the usage from the usage credit to determine an unused portion of the credit, wherein said central operating unit selectively activates the particular telephone upon receiving the telephone usage credit, and said central operating unit selectively deactivates the particular telephone upon depletion of the credit or upon request.

8. The system of claim 7, further comprising means for calculating a refund from any unused portion of said usage credit.

9. A method of operating a call center comprising the steps of:

linking a plurality of telephones to a central operating unit by a junction box and a switched area network, for selectively activating each of the plurality of telephones, the central operating unit being operatively connected to an information storage device for storing information, selectively activating a particular telephone from said plurality of telephones upon receiving a deposit of telephone usage credit from a patron of said calling center, continuously recalculating the particular telephone's usage and continuously subtracting the usage from the usage credit to determine an unused portion of the credit, and selectively deactivating said particular telephone upon request of said patron or upon expiration of the usage credit.

10. The method of claim 9, further comprising the step, after the deactivating step, of refunding to said patron any unused portion of said usage credit.

* * * * *